United States Patent Office 3,644,586
Patented Feb. 22, 1972

3,644,586
HIGH MODULUS, HIGH IMPACT TERPOLYMER COMPOSITION
Edward M. Hagerman, Royal Oak, Mich., assignor to General Motors Corporation, Detroit, Mich.
No Drawing. Filed July 16, 1968, Ser. No. 745,128
Int. Cl. C08f 15/04
U.S. Cl. 260—880 R
2 Claims

ABSTRACT OF THE DISCLOSURE

A styrene-acrylonitrile grafted polyisoprene composition wherein the polyisoprene is polymerized to a high molecular weight, characterized by a limiting viscosity number of at least 1.6 in benzene at 30° C., has a tensile modulus of elasticity of at least about 500,000 p.s.i. and an Izod impact strength at about room temperature of greater than 4.0 foot pounds per inch of notch.

---

Acrylonitrile-butadiene-styrene (ABS) type resins are recognized as thermoplastic materials of relatively high tensile strength and impact strength. They frequently are molded into articles which are expected to operate under conditions normally considered quite severe for thermoplastics. ABS-type polymers typically include a resin component, e.g. styrene-acrylonitrile copolymer and an elastomer component, e.g. polybutadiene. Heretofore, the properties of the final product have been a compromise usually dictated by the relative concentrations of the resin and elastomer constituents. When a particular production application required high impact strength, the elastomer content would be increased to provide toughness. If high tensile properties were sought, resin content could be increased at the expense of the elastomer to yield a thermoplastic employable at somewhat higher loads. However, in the prior art one could not expect to produce ABS compositions, or modified ABS compositions, having tensile modulus of elasticity values (ASTM D–638) markedly greater than those displayed by the conventional formulations without suffering a concomitant reduction in Izod impact strength values (ASTM D–256–56). Previously, individual constituents in the ABS system have been replaced or chemically modified in an attempt to produce better overall physical properties. Up to the present time, however, no modification of the ABS system has been devised which is commercially competitive with the parent with respect to both physical properties and cost. Also techniques have been developed to graft styrene-acrylonitrile copolymer to the polybutadiene (or other elastomer) chains to form a terpolymer. In some ABS compositions the chemical bond between the polybutadiene and at least a portion of the styrene-acrylonitrile copolymer provided better porperties than were obtainable in a simple mixture of the elastomeric and resin constituents. However, none of these techniques have succeeded in producing an ABS-type resin having a tensile modulus of elasticity greater than about 500,000 p.s.i. and an Izod impact strength at 73° F. greater than about 4.0 foot pounds per inch of notch.

Accordingly, it is an object of the present invention to provide a specific acrylonitrile-isoprene-styrene terpolymer composition having especially desirable physical properties which are characterized by a tensile modulus of elasticity, determined according to ASTM D–638, greater than 500,000 p.s.i. and an Izod impact strength, determined according to ASTM D–256–56, greater than 4.0 foot pounds per inch of notch.

It is another object of the present invention to provide an ABS-type thermoplastic composition of relatively inexpensive, commercially available materials having a combination of physical properties heretofore unobserved in ABS-type resins.

It is a further object of the present invention to provide a strong tough acrylonitrile-isoprene-styrene terpolymer resin by increasing the molecular weight of the polyisoprene component and controlling the amount and composition of the styrene-acrylonitrile copolymer component.

In accordance with the invention these and other objects are accomplished by preparing a styrene-acrylonitrile grafted polyisoprene terpolymer material wherein the molecular weight of the polyisoprene component is in the range of about 250,000 to 350,000. Substantially pure monomeric isoprene is polymerized by an emulsion process wherein the concentration of chain modifier is carefully controlled to obtain a high molecular weight product. The molecular weight of the polyisoprene may be suitably characterized by determining the limiting viscosity number of the polymer in benzene solution at 30° C. The value arrived at is a viscosity-average molecular weight. Monomeric styrene and acrylonitrile are added to the polyisoprene latex together with suitable additional emulsifier, initiator and modifier. Preferably, a ratio of about 76 parts of styrene to 24 parts of acrylonitrile is employed. The emulsion copolymerization reaction is conducted whereby a mixture of styrene-acrylonitrile grafted polyisoprene terpolymer and styrene-acrylonitrile copolymer is obtained. Preferably, polyisoprene comprises 20–30% by weight of the mixture and 50–75% by weight of the styrene-acrylonitrile copolymer is grafted to the polyisoprene through covalent bonds. The resultant latex is coagulated and dried to powder form. The powder may be molded or processed by other conventional thermoplastic resin handling techniques into strong, tough articles of manufacture.

A specific example of the preparation of my acrylonitrile-styrene grafted polyisoprene terpolymer composition will further illustrate the principles of the invention. In the initial step high molecular weight polyisoprene is prepared in latex form by an emulsion polymerization technique. Four-hundred-eighty (480) parts of isoprene, 1023 parts water, forty parts sodium oleate (emulsifier), 3.9962 parts potassium persulfate (initiator) and 1.11 parts ter-dodecylmercaptan (modifier) were mixed together and stirred in an autoclave at 50° C. for sixteen hours. The reaction mixture was removed from the autoclave and unreacted isoprene was stripped from the latex with steam. The conversion of isoprene monomer to polymer was determined to be about 60.7%. A small sample of the latex was taken and the polyisoprene coagulated and dried. The limiting viscosity number of dilute benzene solutions of the polymer at 30° C. was determined to be 1.6. The average molecular weight of the polymer was calculated to be about 270,000.

To 525 parts of the polyisoprene latex were added 220 parts styrene, 72 parts acrylonitrile, ten parts sodium oleate, 1.04 parts ter-dodecylmercaptan, and 2.0025 parts potassium persulfate to form an emulsion. The emulsion was maintained at 50° C. for six hours.

The resultant latex was creamed with a 5% aqueous sodium chloride solution, coagulated with a 5% aqueous sulfuric acid solution, filtered, washed with water and methanol and dried to yield a powder mixture of styrene-acrylonitrile grafted polyisoprene terpolymer and styrene-acrylonitrile copolymer. The conversion of monomer to polymer was about 75.4%. The resultant product contained about 30% polyisoprene by weight. The dried resin was milled at 340–350° F. and molded for fifteen minutes at 350° F. under thirty tons force into tensile, Izod and heat deflection test specimens. The tensile strength and tensile modulus of the resin according to ASTM D–638 were determined to be 9,000 p.s.i. and 500,000 p.s.i.

respectively. The elongation at failure was 1.8%. The notched Izod impact strength of the resin according to ASTM D-256-56 was determined to be 4.8 foot pounds per inch of notch at 73° F. Heat deflection temperature according to ASTM D-648-56 (unannealed specimen) at 264 p.s.i. was found to be 190° F.

For purposes of comparison an ABS resin advertised as having a high modulus of elasticity was obtained from a commercial source. Its properties which were determined in accordance with the above-identified ASTM procedures, were as follows: tensile strength—4200 p.s.i., tensile modulus—380,000 p.s.i., Izod impact strength—3.1 foot pounds per inch of notch and heat deflection temperature—225° F. It is noted that the tensile properties of the high strength ABS resin are markedly lower than those found in my acrylonitrile-isoprene-styrene resin. It is also noted that despite the higher tensile properties obtained in my resin, the Izod impact strength is also markedly greater than that of the commercial resin. This is surprising because all previous experience has indicated that an increase in tensile properties results in a concomitant decrease in impact strength.

In general, to obtain the excellent overall physical properties characterized in the above example I have found that my acrylonitrile-isoprene-styrene resin should contain 20-30% by weight high molecular weight polyisoprene and the balance styrene-acrylonitrile copolymer. Over half and preferably 50-75% of the copolymer is grafted to the polyisoprene, the remainder existing substantially as copolymer. The copolymer itself essentially consists of 72-80% by weight styrene and the balance acrylonitrile. For the most part the preparation of the terpolymer-copolymer mixture is accomplished by conventional emulsion polymerization techniques. However, it is critical that the concentration of the chain modifier employed be kept low to obtain relatively high molecular weight polyisoprene. Based upon 480 parts of monomeric isoprene as described in the above example, polyisoprene of suitable molecular weight may generally be obtained by employing 750-1500 parts water, 20-60 parts sodium oleate, less than 1.5 parts ter-dodecylmercaptan and 2-5 parts potassium persulfate. In the subsequent grafting step in which styrene and acrylonitrile are copolymerized, the quantities of emulsifier, initiator and chain modifier may be varied about ±20% from the proportions set forth in the above example. With polyisoprene having a molecular weight in the range of about 250,000 to about 350,000 the resulting grafted terpolymer-copolymer has exceptional physical properties. Tensile modulus of elasticity values are realized of at least about 500,000 p.s.i. or higher. Tensile modulus values of this order are substantially above such properties currently found in available commercial materials. An additional surprising factor, however, is at the same time the resin has an extraordinary high Izod impact strength for a resin of such high tensile strength. Izod impact values of 4.0 foot pounds per inch of notch or higher are obtainable in the above-defined acrylonitrile-isoprene-styrene resins wherein the polyisoprene has a molecular weight greater than 250,000. I have found that with a molecular weight above about 350,000 the polyisoprene latex commences to gel and becomes unmanageable for the further processing which is necessary to produce the terpolymer.

The molecular weight of the polyisoprene is suitably characterized in accordance with the subject invention by determination of the limiting viscosity number of dilute benzene solutions of the polymer. Viscosity measurements of polymer solutions are readily made in most chemical laboratories and are quick, inexpensive means of estimating the molecular weight of the polymer. The value of the viscosity of a polymer solution is a function of the structure of the polymer, its molecular weight, the solvent employed and the temperature at which the solution is tested. In the case of polyisoprene prepared as in the above example, I have found that limiting viscosity measurements of dilute benzene solutions of the polymer at 30° C. are suitable for determining the molecular weight of the polyisoprene for purposes of my invention. As is well known, limiting viscosity numbers may be determined by measuring the viscosity of polymer solutions at varying concentrations, plotting viscosity numbers and/or logarithmic viscosity numbers vs. polymer concentration and extrapolating to zero polymer concentration to obtain the limiting viscosity number. As noted, the resulting value is characteristic of the molecular weight of the resin. Other techniques may be employed to obtain absolute values of the molecular weight and, if desired, in many instances a correlation made with viscosity data such that it may be used to estimate molecular weight.

The molecular weight of styrene-acrylonitrile copolymer in the subject resin cannot be readily measured in that environment. Accordingly, the molecular weight of these materials cannot be specified. However, the resin constituents comprise 70-80% of the acrylonitrile-isoprene-styrene composition and styrene makes up 72-80% of the copolymer mixture. It is also preferred that the copolymer be prepared according to the general techniques described in the above example. Such copolymer compositions in conjunction with the high molecular weight polyisoprene have been found to produce the resins having highly desirable thermoplastic physical properties of this invention.

While my invention has been described in terms of a specific embodiment it will be realized by those skilled in the art that other forms may readily be adapted and the scope of the invention should be considered limited only by the following claims.

I claim:
1. A styrene-acrylonitrile grafted polyisoprene material consisting substantially by weight of 20-30% polyisoprene and the balance styrene-acrylonitrile copolymer, wherein about 50-75% by weight of said copolymer is grafted to said polyisoprene through covalent bonds, the remainder existing as ungrafted copolymer, said styrene-acrylonitrile copolymer consisting of 72-80% by weight styrene, the viscosity-average molecular weight of said polyisoprene being the range of 250,000 to 350,000 whereby the tensile modulus of elasticity of said material as determined by ASTM D-638 is at least 500,000 p.s.i. and the Izod impact strength as determined by ASTM D-256-56 is at least 4.0 foot pounds per inch of notch.

2. A styrene-acrylonitrile grafted polyisoprene material consisting substantially by weight of 20-30% polyisoprene and the balance styrene-acrylonitrile copolymer, wherein 50% by weight or more of said copolymer is grafted through covalent bonds to said polyisoprene, the remainder existing as ungrafted copolymer, said styrene-acrylonitrile copolymer consisting of 72-80% by weight styrene, the viscosity-average molecular weight of said polyisoprene being in the range of 250,000 to 350,000 whereby the tensile modulus of elasticity of said material as determined by ASTM D-638 is at least 500,000 p.s.i. and the Izod impact strength as determined by ASTM D-256-56 is at least 4.0 foot pounds per inch of notch.

References Cited

UNITED STATES PATENTS

| | | | |
|---|---|---|---|
| 3,168,593 | 2/1965 | Fremon et al. | 260—880 |
| 3,448,175 | 6/1969 | Doak et al. | 260—880 |
| 3,488,743 | 1/1970 | Baer et al. | 260—880 |

FOREIGN PATENTS

| | | | |
|---|---|---|---|
| 660,747 | 4/1963 | Canada | 260—880 |

JAMES A. SEIDLECK, Primary Examiner

U.S. Cl. X.R.

260—876